United States Patent [19]
Sakakibara et al.

[11] Patent Number: 4,691,140
[45] Date of Patent: Sep. 1, 1987

[54] FLUORESCENT LAMP

[75] Inventors: Yuichi Sakakibara, Yokohama; Yukio Takahashi, Utsunomiya; Hideharu Shima, Kanuma, all of Japan

[73] Assignee: Kabushiki Kaisha Toshiba, Kawasaki, Japan

[21] Appl. No.: 890,888

[22] Filed: Jul. 28, 1986

Related U.S. Application Data

[63] Continuation of Ser. No. 671,091, Nov. 13, 1984, abandoned.

[30] Foreign Application Priority Data

Nov. 17, 1983 [JP] Japan ................. 58-215028

[51] Int. Cl.$^4$ .................. H01J 61/44; H01J 61/46
[52] U.S. Cl. ........................... 313/486; 313/489
[58] Field of Search ................. 313/486, 489

[56] References Cited

U.S. PATENT DOCUMENTS 2,151,496 3/1939 Beese ..................... 313/486 X
3,377,494 4/1968 Repsher ..................... 313/489

FOREIGN PATENT DOCUMENTS 59649 5/1980 Japan ..................... 313/486

Primary Examiner—Palmer C. DeMeo
Assistant Examiner—K. Wieder
Attorney, Agent, or Firm—Cushman, Darby & Cushman

[57] ABSTRACT

A fluorescent lamp is disclosed which has a glass bulb with a coating layer of phosphor particles on the inner surface, the phosphor particles being covered by a protective layer consisting of a metal oxide. The phosphor particles are not in direct contact with the glass bulb by virtue of the protective layer. Thus, it is possible to prevent the reduction of the mechanical strength of the bulb and reduction of the luminuous efficiency of phosphor due to interaction between the glass bulb and phosphor particles.

7 Claims, 12 Drawing Figures

FLUORESCENT LAMP

This is a continuation of application Ser. No. 671,091, filed Nov. 13, 1984, which was abandoned upon the filing hereof.

BACKGROUND OF THE INVENTION

This invention relates to a fluorescent lamp and, more particularly, to a fluorscent lamp in which reduction of the mechanical strength of the bulb and reduction of the luminous efficiency due to interaction of phosphor and glass constituting the bulb are prevented.

The fluorescent lamp is generally manufactured by coating fluorescent particles in the form of a film on the inner surface of the bulb, evacuating the bulb through an exhaust tube, activating the electrode material, filling mercury and starting gas in the bulb, and tipping the exhaust tube. When manufacturing a fluorescent lamp of a curved or bent tube, a step of curving or bending the tube is additionally provided.

In the process of manufacture of the florescent lamp as described above, the bulb is heated several times. Since the phosphor particles are in direct contact with the bulb, it is likely that phosphor particles will sink into the softened inner surface or a component of the phosphor will be dissolved or dispersed in the glass constituting the bulb, thus reducing the mechanical strength of the bulb. Therefore, the bulb is readily broken or damaged by an external shock. Further, in some cases it is likely that a glass component intrudes into the phosphor film to reduce the luminous efficiency of the fluorescent lamp. These phenomena are extremely remarkable in the case where lead-activated barium silicate phosphor ($BaSi_2O_5:Pb$), which has a chemical structure resembling glass, is employed.

SUMMARY OF THE INVENTION

An object of the invention is to provide a fluorescent lamp in which reduction of the mechanical strength of the bulb and reduction of luminous efficiency due to interaction between phosphor and glass constituting bulb are prevented.

The fluorescent lamp according to the invention has a glass bulb with phosphor particles coated on the inner surface. The surfaces of the phosphor particles are provided with a protective layer made of metal oxide.

According to the invention, the protective layer consists of any metal oxide so long as it is colorless and thermally and chemically stable. Preferred examples of the metal oxide are alumina, silica, titanium and mixtures of these substances.

The quantity of metal oxide is at least 0.05% by weight and less than 3% by weight, more preferably between 0.1 and 1% by weight, based on the weight of phosphor particles. If it is below 0.05% by weight, it is insufficient to improve the mechanical strength of the bulb and the luminous efficiency of the bulb. If it is 3% by weight or more, the protective layer prevents light from emitting from the phosphor particles which reduces the light output.

According to the invention, any phosphor may be used for the fluorescent lamp, but a remarkable effect may be obtained when lead-activated barium silicate phosphor ($BaSi_2O_5:Pb$) is used.

With the fluorescent lamp according to the invention, the phosphor particles with a coating of the protective layer may be formed not only directly on the inner surface of the bulb but also on a barrier layer formed on the inner surface of the bulb. The barrier layer may be of metal oxide or alkali-earth metal phosphate. Preferred examples of the metal oxide are alumina, silica and titanium, and the alkali-earth metal phosphate is calcium pyrophosphate. The quantity of the barrier layer is suitably 0.005 to 0.5 mg per 1 $cm^2$ of the bulb inner surface.

The average diameter of the phosphor particles is suitably 2 to 15 $\mu$m, and the average diameter of the metal oxide particles formed on the surface is preferably 0.2 $\mu$m or less, more preferably 0.01 to 0.1 $\mu$m.

DETAILED DESCRIPTION OF THE PREFERRED EMBODIMENT

Now, the invention will be described in detail with reference to preferred embodiments thereof.

EMBODIMENT 1

Figure 1:
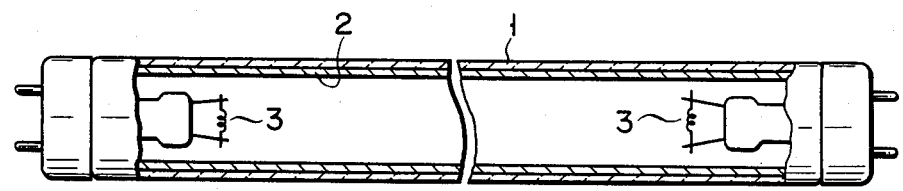
FIG. 1 is a sectional view showing an embodiment of the fluorescent lamp according to the invention.
Figure 2:
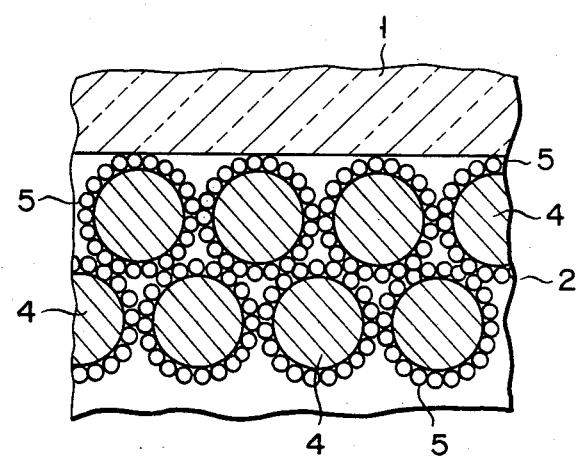
FIG. 2 is fragmentary enlarged-scale sectional view, showing the fluorescent lamp shown in FIG. 1.

FIGS. 1 and 2 show an embodiment of the invention in which phosphor particles are directly coated on the inner surface of the bulb. Referring to the Figure, reference numeral 1 designates a bulb consisting of soda lime glass, 2 a phosphor coating layer formed on the inner surface of the bulb 1, and 3 opposed filament electrodes sealed at the opposite ends of the bulb 1.

As shown in FIG. 2, the phosphor coating layer 2 consists of phosphor particles 4 coated with a protective layer 5 consisting of such a metal oxide as alumina, silica or titanium. It is directly coated on the inner surface of the bulb 1. The phosphor particles 4 are in contact with one another or the glass of the bulb 1 via the protective layer 5.

To obtain a lamp as shown, fine particles of metal oxide are dispersed in an organic solvent such as ethyl alcohol, and then phosphor particles 4 are immersed in a dispersion containing metal oxide particles and dried, therby forming the protective layer 5 on the surface of the phosphor particles 4. These phosphor particles 4 with the protective layer 5 are used to manufacture a fluorescent lamp in an ordinary method.

In the manufacture of such a fluorscent lamp, the bulb 1 is heated several times. However, since the phosphor particles 4 are in contact with the inner surface of the bulb 1 via the protective layer 5, neither the phosphor particles 4 sink in the softened glass, nor the phosphor component is dissolved in the glass. Thus, the mechanical strength of the bulb 1 is never reduced. In addition, since the glass component does not intrude into the phosphor particles 4, the luminous efficiency of the phosphor is never reduced.

Figure 3:
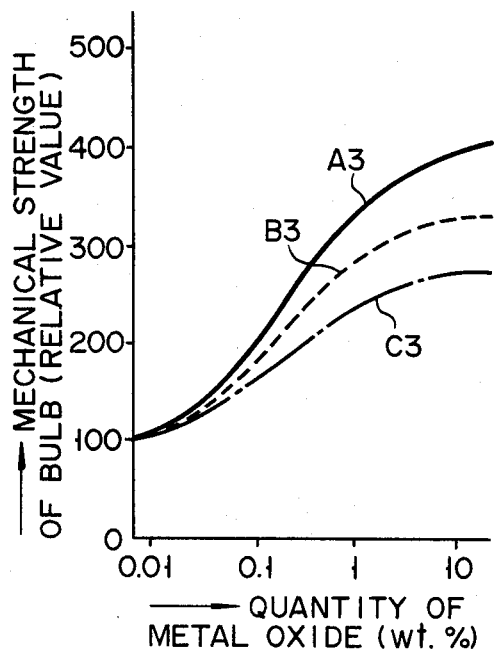
FIGS. 3 and 4 are graphs showing the relation between the quantity of metal oxide covering the surface of phosphor particles and the mechanical strength of the bulb in the embodiments shown in FIGS. 1 and 2.
Figure 4:
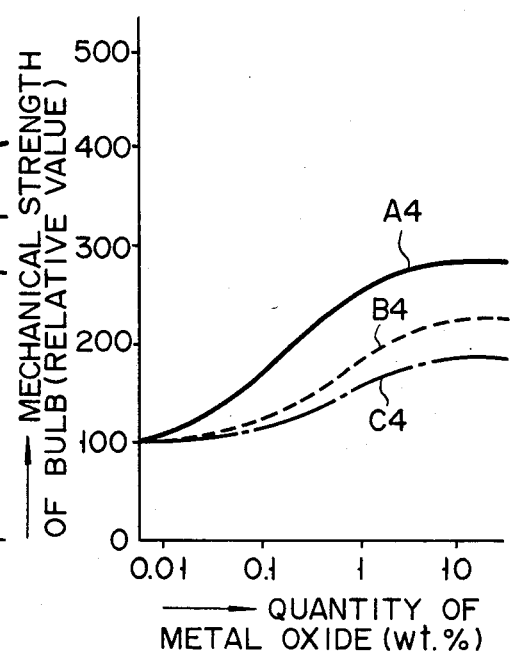

Destructive tests using a steel ball were conducted on straight tube type 18 W fluorescent lamps having the structure as described above. Either lead-activated barium silicate phosphor ($BaSi_2O_5$:PB) or white calcium halophosphate phosphor was used as the phosphor of the test samples. As the metal oxide, alumina, silica and titanium oxide were used independently. The baking temperature of the bulb 1 was set to 550° C. In the destructive test, a steel ball of approximately 5 g was dropped onto a central portion of the bulb 1 from various heights, and the magnitude of the impact when the bulb was broken was measured. The impact was represented as the product of the weight of the steel ball and the height immediately before the bulb was broken. The impact was indicated as the mechanical strength of the bulb. FIGS. 3 and 4 show the results of tests. More specifically, FIG. 3 shows the relation between the mechanical strength of the bulb and the quantity of various metal oxides used in the case where $BaSi_2O_5$:Pb phosphor was used. In FIG. 3, the abscissa is taken for the weight % of metal oxide based on the weight of phosphor particles, and the ordinate is taken for the relative mechanical strength of the bulb. Curve $A_3$ was obtained when alumina was used, curve $B_3$ was obtained when silica was used, and curve $C_3$ was obtained when titania was used. FIG. 4 shows the relation between the mechanical strength of the bulb and the quantity of various metal oxides used in the case where white calcium halophosphate phosphor was used. Like FIG. 3, the abscissa is taken for the quantity of metal oxides, and the ordinate was taken for the mechanical strength of the bulb. Curve $A_3$ was obtained with alumina, curve $B_3$ was obtained with silica, and curve $C_3$ was obtained with titania. It will be seen from FIGS. 3 and 4 that the mechanical strength of the bulb is high when the quantity of metal oxide is 0.05% by weight or above.

Figure 5:
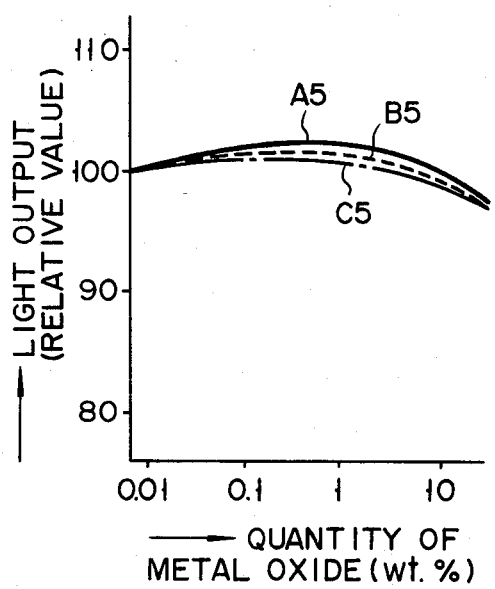
FIGS. 5 and 6 are graphs showing the relation between the quantity of metal oxide covering the surface of phosphor particles and the light output of the lamp in the embodiments of FIGS. 1 and 2.
Figure 6:
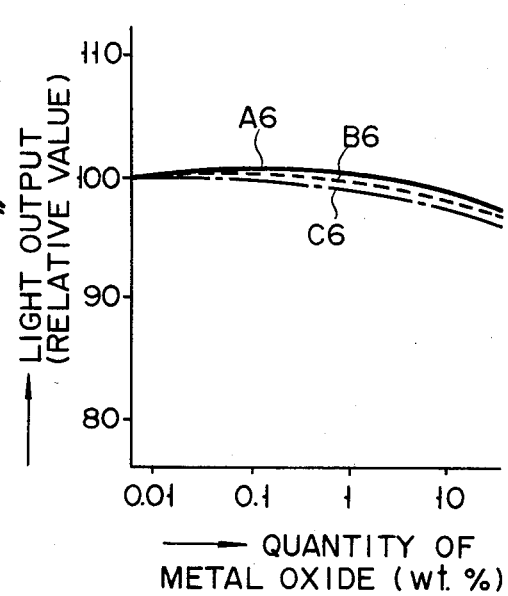

FIG. 5 shows the relation between the light output and the quantity of various metal oxides used in the case where $BaSi_2O_5$:Pb phosphor is used. In the Figure, the abscissa is taken for the quantity of metal oxide, and the ordinate is taken for the relative light output. Curve $A_3$ s obtained with alumina, curve $B_3$ with silica, and curve $C_3$ with titania. FIG. 6 shows the relation between the light output and the quantity of various metal oxides used in the case where white calcium halophosphate phosphor is used. Like FIG. 5, the abscissa is taken for the quantity of metal oxide, and the ordinate is taken for the light output. Curve $A_3$ is obtained with alumina, curve $B_3$ is obtained with silica, and curve $C_3$ is obtained with titania. As is seen from FIGS. 5 and 6, the light output is reduced when the quantity of metal oxide is 3% by weight or above.

The three different metal oxides noted above are by no means limitative, and any other metal oxide may be used so long as it is possible to prevent the sinking of phosphor particles in glass and the dissolution of phosphor due to heating. Further, the metal oxides may be used either independently or as mixtures. The method of coating is not limited to that mentioned above. Further, the phosphor used should not be eroded by glass component.

EMBODIMENT 2

Figure 7:
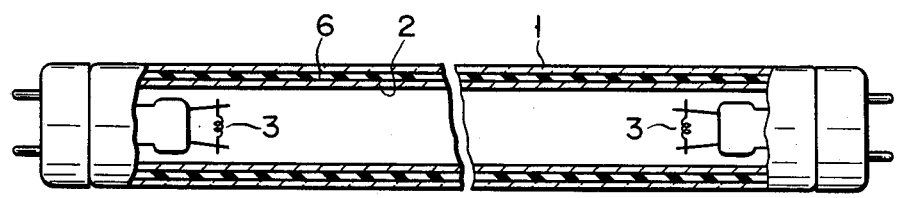
FIG. 7 is a sectional view showing a different embodiment of the fluorescent lamp according to the invention.
Figure 8:
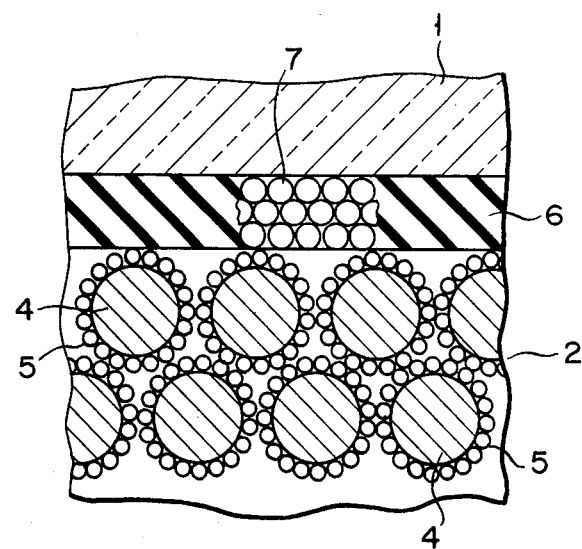
FIG. 8 is a fragmentary enlarged-scale sectional view showing the fluorescent lamp shown in FIG. 7.

FIG. 7 shows a different embodiment in which phosphor particles are formed on an barrier layer formed on the inner surface of a bulb. In this embodiment, an barrier layer 6 is formed on the inner surface of a bulb 1, and phosphor particles 4 covered by the protective layer 5 consisting of a metal oxide is provided on the layer 6 as in the first embodiment. In FIGS. 1 and 7, like parts are designated by like reference numerals. The barrier layer 6 on the inner surface of the bulb 1, as shown in FIG. 8, is formed by dispersing particles 7 of alumina, silica, titania, alkali earth metal phosphate, etc., together with a binder in an organic solvent, coating the resultant dispersion on the inner surface of the bulb 1, and baking the coating at a temperature of 550° C.

Figure 9:
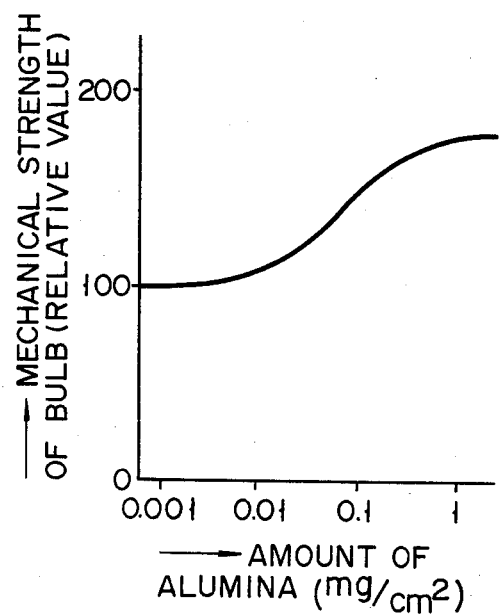
FIGS. 9 and 10 are graphs showing the relation between the quantity of the barrier layer provided on the bulb inner surface and the mechanical strength of the bulb and light output of the lamp in the embodiments shown in FIGS. 7 and 8.
Figure 10:
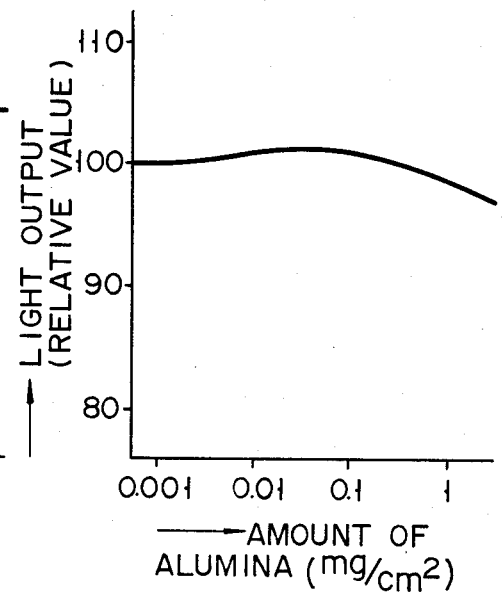
Figure 11:
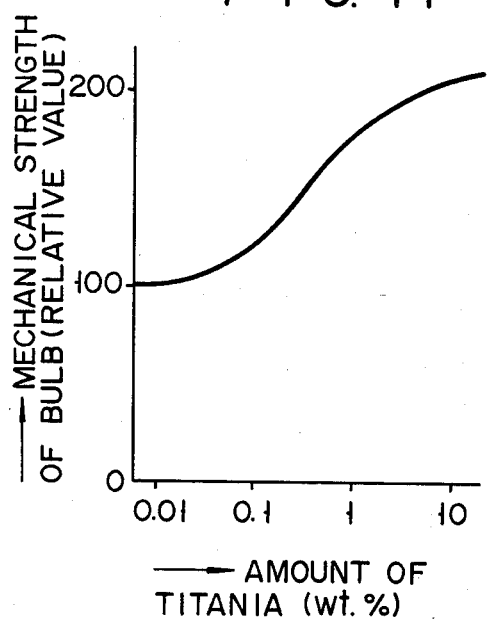
FIGS. 11 and 12 graphs showing the relation between the quantity of metal oxide covering the surface of phosphor particles and the mechanical strength of the bulb and light output of the lamp in the embodiments shown in FIGS. 7 and 8.
Figure 12:
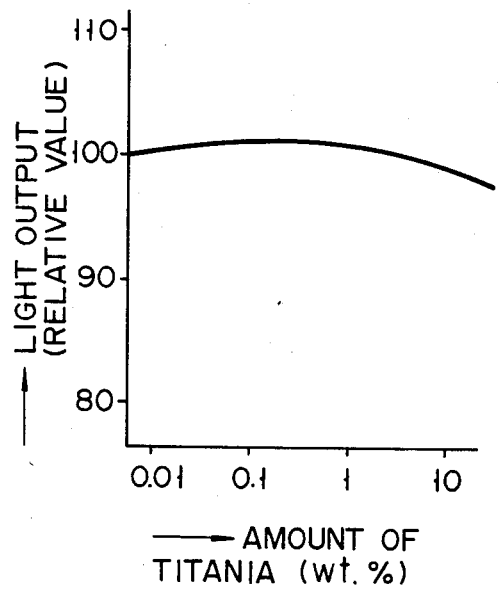

Mechanical strength tests and light emission tests were conducted in connection with this embodiment in the manner as described before in connection with the first embodiment. FIG. 9 shows the relation between the mechanical strength of the bulb and the quantity of alumina where the barrier layer 6 on the inner surface of the bulb 1 consists of alumina and phosphor particles of $BaSi_2O_5$:Pb coated by 0.3% by weight of silica particles is provided on the barrier layer. FIG. 10 shows the relation between the light output and quantity of alumina constituting the barrier layer. In FIGS. 9 and 10 the abscissa is taken for the quantity (mg) of alumina per 1 $cm^2$ of the bulb inner surface area. In the graph of FIG. 9, the ordinate is taken for the relative mechanical strength of the bulb, and in the graph of FIG. 10, the ordinate is taken for the light output. FIG. 11 shows the relation between the relative mechanical strength of the bulb and the quantity of titania in the case of a lamp where the barrier layer 6 on the inner surface of the bulb 1 consists of calcium pyrophosphate with a coating density of 0.5 $mg/cm^2$ and white calcium halophosphate phosphor particles coated by titania particles is provided on the protective layer 6. FIG. 12 shows the relation between the light output and the quantity of titania in this case. In both Figures the abscissa is taken for the quantity of titania. In the graph of FIG. 11, the ordinate is taken for the relative mechanical strength of the bulb, and in FIG. 12, the ordinate is taken for the light output. It will be seen from FIGS. 9 to 12 that if the coating density of the barrier layer 6 on the inner surface of the bulb 1 is below 0.005 $mg/cm^2$, the effect is slight, whereas if it exceeds 0.5 $mg/cm^2$, the light output is reduced. Also, the quantity of the metal oxide covering the phosphor particles 4 is preferably at least 0.05% by weight and less than 3% by weight.

Again in this embodiment, the metal oxide and metal phosphate coated on the inner surface of the bulb are not limited to those in the examples mentioned, and any substitute may be used so long as the sinking of phosphor in the glass and the dissolving of phosphor can be prevented. The metal oxide covering the phosphor also may be replaced from the same point of view. In this example, the phosphor particles and the inner surface of the bulb are isolated from one another by a double protective layer, which is particularly suited for the curved or bent tube type fluorescent lamp.

As has been described in the foregoing, with the fluorescent lamp according to the invention, a protective layer consisting of metal oxide is formed on the surface of phosphor particles so that the phosphor particles never sink into the glass constituting the inner surface of bulb or dissolve. Thus, it is possible to prevent the reduction of the mechanical strength of the bulb. Further, the component of glass never intrudes into the phosphor particles, so it is possible to prevent the reduction of the luminous efficiency of phosphor.

What is claimed is:

1. A fluorescent lamp comprising:
a glass bulb having an inner surface, and
a phosphor coating layer contacting said inner surface; said phosphor coating layer comprising lead-activated barium silicate particles and a protective layer comprising alumina particles coating said phosphor particles, the quantity of said alumina particles being at least 0.05% by weight and less than 3% by weight based on the weight of said lead-activated barium silicate particles, and the average diameter of said alumina particles being 0.01 to 0.1 $\mu$m.

2. A fluorescent lamp according to claim 1, wherein the quantity of alumina is at least 0.05% by weight and less than 3% by weight based on the weight of the phosphor particles.

3. A fluorescent lamp according to claim 1, wherein the quantity of alumina is 0.1 to 1% by weight of the weight of phosphor particles.

4. A fluorescent lamp according to claim 1, wherein said phosphor particles are formed on a barrier layer formed on said inner surface of said glass bulb, said layer being formed from at least one member selected from the group consisting of metal oxides and metal phosphate.

5. A fluorescent lamp according to claim 4, wherein said barrier layer is formed from at least one member selected from the group consisting of alumina, silica, titania and alkali-earth metal phosphate.

6. A fluorescent lamp according to claim 4, wherein the quantity of said barrier layer is 0.005 to 0.5 mg per 1 $cm^2$ of the bulb inner surface area.

7. A fluorescent lamp according to claim 1, wherein said bulb consists of a curved tube.

* * * * *